(12) United States Patent
Van Rijen et al.

(10) Patent No.: US 12,540,202 B2
(45) Date of Patent: Feb. 3, 2026

(54) BIPOLAR MEMBRANE

(71) Applicants: Fujifilm Manufacturing Europe B.V., Tilburg (NL); Fujifilm Corporation, Tokyo (JP)

(72) Inventors: Adrianus Jacobus Van Rijen, Tilburg (NL); Elisa Huerta Martinez, Tilburg (NL)

(73) Assignees: Fujifilm Manufacturing Europe B.V., Tilburg (NL); Fujifilm Corporation, Tokyo (JP)

( * ) Notice: Subject to any disclaimer, the term of this patent is extended or adjusted under 35 U.S.C. 154(b) by 764 days.

(21) Appl. No.: 17/904,995

(22) PCT Filed: Apr. 1, 2021

(86) PCT No.: PCT/EP2021/058641
§ 371 (c)(1),
(2) Date: Aug. 25, 2022

(87) PCT Pub. No.: WO2021/198430
PCT Pub. Date: Oct. 7, 2021

(65) Prior Publication Data
US 2023/0101965 A1 Mar. 30, 2023

(30) Foreign Application Priority Data

Apr. 2, 2020 (GB) .................................... 2004897
Apr. 2, 2020 (GB) .................................... 2004899
Sep. 23, 2020 (GB) .................................... 2015030

(51) Int. Cl.
*C08F 2/50* (2006.01)
*B01D 61/44* (2006.01)
*C08J 5/22* (2006.01)

(52) U.S. Cl.
CPC .............. *C08F 2/50* (2013.01); *B01D 61/445* (2013.01); *C08J 5/2206* (2013.01)

(58) Field of Classification Search
None
See application file for complete search history.

(56) References Cited

U.S. PATENT DOCUMENTS

| | | | | |
|---|---|---|---|---|
| 5,401,408 A | * | 3/1995 | Umemura | ............ B01D 61/445 |
| | | | | 210/500.25 |
| 7,901,831 B2 | | 3/2011 | Brunea | |
| 2007/0111072 A1 | | 5/2007 | Wayne et al. | |
| 2016/0310901 A1 | | 10/2016 | Ramanan et al. | |

FOREIGN PATENT DOCUMENTS

| | | | | |
|---|---|---|---|---|
| CN | 102304723 A | * | 1/2012 | ............... C25B 1/16 |
| CN | 109231377 A | | 1/2019 | |
| WO | 2018080834 A1 | | 5/2018 | |

OTHER PUBLICATIONS

Machine translation of Detailed Description of CN 102304723A, 11 pages, retrieved from ESPACENET on Jun. 14, 2026. (Year: 2012).*
Walsh, Zarah. "Exotic Monoliths" Thesis, 2018.
Gopidas et al. "Photochemistry In Polymers. Photoinduced Electron Transfer between Phenosafranine and Triethylamine In Perfluorosulfonate Membrane" J. Phys. Chem., 94, 11 (1990), 4723-4727.
Xu et al. "Formulation and characterization of a novel fluoride-releasing dental composite" Dental Meterials, 22, 11 (2006), 1014-1023.
Neumann et al. "Molar extinction coefficients and the photon; absorption efficiency of dental photoinitiators and; light curing units" Journal of Dentistry, 33 (2005), 525-532.
Kozaderova. "Electrochemical Characterization of an MB-2 Bipolar Membrane Modified by Nanosized Chromium (III) Hydroxide" Nanotechnologies in Russia, 13, 9, (2019), 508-515.
Cerar, Janez. "Reaction between Chromium(III) and EDTA Ions:; an Overlooked Mechanism of Case Study Reaction; of Chemical Kinetics" Acta Chimica Slovenica, 62 (2015), 538-545.

* cited by examiner

*Primary Examiner* — Fred M Teskin
(74) *Attorney, Agent, or Firm* — Banner & Witcoff, Ltd.

(57) ABSTRACT

Bipolar membranes (BPMs) comprising a cation exchange layer (CEL) and an anion exchange layer (AEL) wherein the colour properties of the CEL are visibly different to the colour properties of the AEL. The CEL and the AEL are easily distinguishable so that a stack of membranes comprising the BPMs can be built fast and without mistakes in layer order.

20 Claims, No Drawings

BIPOLAR MEMBRANE

RELATED APPLICATIONS

This application is a National Stage Application under 35 U.S.C. 371 of co-pending PCT application PCT/EP2021/058641 designating the United States and filed Apr. 1, 2021; which claims the benefit of GB application number 2004897.1 and filed Apr. 2, 2020; GB application number 2004899.7 and filed Apr. 2, 2020; and GB application number 2015030.6 and filed Sep. 23, 2020, each of which are hereby incorporated by reference in their entireties.

TECHNICAL FIELD

This invention relates to bipolar ion exchange membranes and to processes for their preparation and use.

DESCRIPTION OF THE RELATED ART

Ion exchange membranes are used in electrodialysis, reverse electrodialysis, electrolysis, diffusion dialysis and a number of other processes. Typically the transport of ions through the membranes occurs under the influence of a driving force such as an ion concentration gradient or, alternatively, an electrical potential gradient. Ion exchange membranes are generally categorized as cation exchange membranes (CEMs), anion exchange membranes (AEMs), depending on their charge, or bipolar membranes (BPMs) if they comprise both positively charged groups and negatively charged groups. CEMs comprise negatively charged groups that allow the passage of cations but reject anions, while AEMs comprise positively charged groups that allow the passage of anions but reject cations. BPMs comprise both positively charged groups and negatively charged groups, for example in the form of a cation exchange layer (CEL) and an anion exchange layer (AEL).

Some ion exchange membranes comprise a porous support which provides mechanical strength. Such membranes are often called "composite membranes" or "pore-filled membranes" due to the presence of both an ionically charged polymer which discriminates between oppositely charged ions and the porous support which provides mechanical strength.

Ion exchange membranes are often used in the form of a stack comprising both AEMs and CEMs, e.g. in electrodialysis and electrodeionization where AEMs and CEMs alternate. For specific applications BPMs are used that have a functional layer having anion exchange properties (the AEL) and a functional layer having cation exchange properties (the CEL). In several applications a stack of membranes comprises BPMs and AEMs and/or CEMs.

In many cases all membranes used in a stack or device have a similar, usually whitish, appearance which makes it difficult to distinguish between them. For BPMs a problem arises due to the small visual difference between the AEL and the CEL. In assembling the stack, either manually or in automated processes, the small visual difference between the AEL and the CEL of the BPM may lead to mistakes such as a BPM stack where not all of the membranes are placed in the same orientation. Such mistakes can lead to severe damage of the membranes and therefore low performance of the stack and should be avoided.

SUMMARY OF THE INVENTION

The present invention provides several means for providing BPMs in which the CEL and AEL are easily visually distinguishable. Such means include the colour properties of the AEL and CEL.

It is an aim of the present invention to provide BPMs that are strong and in which the CEL and the AEL are easily distinguishable so that a stack of membranes including BPMs can be built fast and without mistakes.

According to a first aspect of the present invention there is provided a bipolar membrane (BPM) comprising a cation exchange layer (CEL) and an anion exchange layer (AEL) wherein the colour properties of the CEL are visibly different to the colour properties of the AEL.

DETAILED DESCRIPTION

In this document (including its claims), the verb "comprise" and its conjugations is used in its non-limiting sense to mean that items following the word are included, but items not specifically mentioned are not excluded. In addition, reference to an element by the indefinite article "a" or "an" does not exclude the possibility that more than one of the elements is present, unless the context clearly requires that there be one and only one of the elements. The indefinite article "a" or "an" thus usually mean "at least one".

The visible difference in colour properties between the AEL and CEL of a BPM make the layers distinguishable by human eye and by automatic sensors or similar recognition systems. For human operation the visible difference in colour properties between the AEL and CEL is preferably visible when the AEL and CEL are viewed in, for example, daylight and/or in artificial light (e.g. light produced by electrical means, e.g. light used in an industrial environment. For automated manufacture of the BPMs the visible difference in colour properties between the AEL and CEL is preferably visible in daylight and/or in artificial light. Artificial light is typically produced by electrical means and includes, for example, visible light (e.g. white, red, orange, yellow, green, blue, indigo and violet light), ultraviolet light and infrared light.

In one preferred embodiment, the visible difference in colour properties between the AEL and CEL is preferably visible under yellow light, especially artificial yellow light (e.g. light of wavelength above 490 nm) as this is particularly useful for making BPMs industrially from AELs and/or CELs which are sensitive to (e.g. degrade in) blue light.

The colour properties of the CEL and AEL and the visible differences therebetween may be quantified spectrophotometrically, e.g. using a spectrophotometer, for example a Konica Minolta CM-3600d spectrophotometer, e.g. using an 8 mm MAV measurement area.

Suitable parameters to quantify the colour properties of the CEL and AEL and the visible differences therebetween are derived from CIEDE2000. CIEDE2000, an International standard specified by the International Commission on Illumination, expresses colour properties and differences using e.g. the CIE $L^*a^*b^*$ colour space or CIELCh colour space where instead of Cartesian coordinates $a^*$, $b^*$, the cylindrical coordinates $C'$ (chroma, relative saturation) and $h'$ (hue angle) are specified. The lightness L is the same for both colour spaces.

The three coordinates of CIE $L^*a^*b^*$ represent the lightness of the colour ($L^*=0$ yields black and $L^*=100$ indicates diffuse white; specular white may be higher), its position between red/magenta and green ($a^*$, negative values indicate green while positive values indicate magenta) and its position between yellow and blue ($b^*$, negative values indicate blue and positive values indicate yellow).

It is the aim of this invention to provide BPMs comprising a cation exchange layer (CEL) and an anion exchange layer (AEL) wherein the colour properties of the CEL are visibly different to the colour properties of the AEL, preferably by including a dye in at least one of the AEL and the CEL. However, excessive amounts of dye are undesirable since this would increase manufacturing costs.

The visible difference in colour properties between the AEL and CEL is preferably a difference in $\Delta E_{00}$, as expressed according to CIEDE2000, of at least 4.

For an easily visible difference in colour properties between the AEL and the CEL the colour of the AEL and/or the CEL is preferably not too white. Therefore preferably the AEL and/or CEL has a lightness L' lower than 90, more preferably lower than 80, e.g. lower than 70.

On the other hand, the colour of the AEL and/or the CEL should not be too dark. Therefore preferably the AEL and/or CEL has a lightness L' higher than 5, more preferably higher than 8, especially higher than 10, more especially at least 15, e.g. at least 20.

The relative saturation chroma C' of the AEL and/or CEL (which can be regarded as the normalized average of a* and b*) is preferably at least 4, more preferably at least 5, especially at least 8.

A difference in colour is preferably expressed as $\Delta E_{00}$ being the well-known formula of CIEDE2000 also referred to as CIELab 2000. Details can be found in e.g. Luo M. R. (2016) CIEDE2000, History, Use, and Performance. In: Luo M. R. (eds) Encyclopedia of Colour Science and Technology. Springer, New York, NY. https://doi.org/10.1007/978-1-4419-8071-7_7 and in the ISO standard ISO 11664-6: 2014.

The colour difference $\Delta E_{00}$ between the AEL and the CEL is preferably at least 4, more preferably at least 8, especially at least 15. Generally $\Delta E_{00}$ is less than 95, especially less than 90.

In the case that the difference in lightness between the AEL and the CEL ($\Delta L'$) and the difference in chroma between the AEL and the CEL ($\Delta C'$) are very low, a visible difference in colour properties may still be present. This can be characterized by $\Delta h'>20$ degrees, preferably $\Delta h'>50$ degrees.

Preferably the colour properties properties of the AEL and/or the CEL are substantially homogeneous, i.e. the colour difference $\Delta E_{00}$ between different parts of the AEL is preferably less than 5 and/or the colour difference $\Delta E_{00}$ between different parts of the CEL is preferably less than 5.

In a preferred embodiment, for easy determination of which side of the BPM is the CEL and which is the AEL, one or both of the AEL and CEL comprises a dye or a combination of dyes such that the colour properties of the CEL are visibly different to the colour properties of the AEL, e.g. the AEL and the CEL contain different dyes or different combinations of dyes, contain the same dye or combination of dyes but in different amounts and/or different ratios.

Preferably at least one of the AEL and CEL contains a dye. Optionally both the AEL and the CEL contain a dye. In one embodiment the AEL and the CEL each contain a different dye. In another embodiment the AEL and the CEL contain the same dye but in different amounts. In certain embodiments the AEL and the CEL contain the same dye in the same amount and are visibly different due to a difference in interaction between the dye and the other components of the corresponding layer which may result in a bathochromic or hypsochromic shift.

For economic reasons it is preferred that the CEL and/or AEL comprise a dye which has another function in addition to providing visible colour. In a preferred embodiment the CEL and/or AEL comprises a dye which is a photoinitiator. The dye which is also a photoinitiator is preferably a dye that upon irradiation with light of an appropriate wavelength and intensity reaches an excited state the energy of which is transferred to a co-initiator by abstracting an electron or hydrogen atom thereof whereupon the co-initiator as a result forms a reactive radical species. Thus, preferably the CEL and/or AEL comprises a dye which, when in the excited state, can react with a co-initiator whereupon radicals are generated. The dye(s) present in the CEL and/or AEL are preferably dyes which do not form ions when irradiated with light. In other words, preferably the AEL and CEL are free from dyes which form ions when irradiated with light. It is especially preferred that the dye(s) present in the CEL and/or AEL are dyes that cannot undergo a regenerative and reversible light-driven dissociation or light-driven association reaction to generate a positively-charged ion and a negatively-charged ion.

Preferably the dye(s) which may be present in the CEL and/or AEL do not pose a health risk, e.g. the dye(s) are preferably free from transition metal ions. Examples of transition metals include Cr, Co, Cu, Ir, Mn, Ni, Os, Ru, Pd, Pt and Re.

Preferably the dye is not, at least initially, covalently bound to the AEL and/or CEL. For example the dye may be physically entrapped within the CEL or AEL. This enables more flexibility in the selection of dyes, including cheaper dyes, and easier manufacturing of the BPMs.

The use of a dye which is also a photoinitiator (instead of using a separate dye and uncoloured photoinitiator) leads to cost advantages by eliminating the need for a separate dye in order to achieve a CEL having visibly different colour properties to the AEL. Thus the dye is preferably a coloured photoinitiator.

In some cases the chemical structure of the dye changes after irradiation. After irradiation the dye may form reaction products which have a different colour from the dye before irradiation or the dye may lose its colour. The latter is not preferred although unreacted dye may remain and hence provide a colour to the formed AEL or CEL.

In one embodiment the AEL and/or CEL is formed from irradiating a curable composition which comprises excess dye which is a photoinitiator (i.e. 'coloured photoinitiator'). As a result there will be some unreacted coloured photoinitiator remaining in the AEL and/or CEL after the irradiation and thus the CEL and AEL will have a colour corresponding to the colour of unreacted coloured photoinitiator used to form them.

When both the AEL and the CEL are formed by photo curing and both require a photoinitiator then preferably the curable compositions used to form the AEL and CEL comprise different amounts of the same coloured photoinitiator and/or different coloured photoinitiators. However, due to differences in charge and structure between the monomers in the curable composition used for preparing the AEL and the monomers in the curable composition used for preparing the CEL surprisingly in many cases the AEL and the CEL end up having visibly different colour properties even when the same coloured photoinitiator is used in each curable composition in the same amount or concentration. This allows for a more efficient manufacturing process since it is possible to use the same dye as coloured photoinitiator for both the CEL and the AEL and still achieve a CEL having visibly different colour properties to the AEL.

Preferably the AEL and/or the CEL is obtainable by irradiating a curable composition comprising a dye which functions as a photoinitiator with light. Preferably the curable compositions comprise:

(a) one or more curable monomers comprising at least one anionic or cationic group;
(b) a dye;
(c) optionally a co-initiator;
(d) optionally a curable monomer which is free from anionic and cationic groups; and
(e) optionally a solvent, preferably an inert solvent.

Preferably the dye is a coloured photoinitiator, especially a Norrish Type II photoinitiator.

Preferably at least one of the CEL and the AEL comprises (e.g. as component (a) in the above curable composition) a dye having an absorption maximum at a wavelength longer than 400 nm, more preferably between 400 and 800, e.g. between 430 nm and 800 nm, when measured in one or more of the following solvents at a temperature of 23° C.: water, ethanol and toluene.

The absorption maxima are preferably measured using a 0.01 wt % concentration of the dye (e.g. a coloured photoinitiator) dissolved in the relevant solvent (i.e. water, ethanol or toluene) at 23° C., e.g. using a 1 mm path length (e.g. a quartz cuvette having an internal length through which light passes of 1 mm). One may measure the absorption maximum using, for example, a Varian Cary™ 100 conc. double beam UV/VIS spectrophotometer from Agilent Technologies.

The molar attenuation coefficient at the absorption maximum (i.e. longer than 400 nm) of the dye is preferably at least 7,500 $M^{-1}$ $cm^{-1}$ (750 $m^2$ $mol^{-1}$), more preferably at least 10,000 $M^{-1}$ $cm^{-1}$. The molar attenuation coefficient may be measured using an UV-VIS spectrophotometer, e.g. a Cary™ 100 UV-visible spectrophotometer from Agilent Technologies.

Preferably the dye is a xanthene, flavin, curcumin, porphyrin, anthraquinone, phenoxazine, camphorquinone, phenazine, acridine, phenothiazine, xanthone, thioxanthone, thioxanthene, acridone, flavone, coumarin, fluorenone, quinoline, quinolone, naphtaquinone, quinolinone, arylmethane, azo, benzophenone, carotenoid, cyanine, phtalocyanine, dipyrrin, squarine, stilbene, styryl, triazine or anthocyanin-derived photoinitiator, in each case provided that it has an absorption maximum at a wavelength longer than 400 nm, when measured in one or more of the following solvents at a temperature of 23° C.: water, ethanol and toluene, or a mixture comprising two or more thereof (e.g. from 2 to 5 of such photoinitiators).

Examples of dyes that can function as photoinitiator having the absorption maximum specified above include eosin Y, eosin Y disodium salt, fluorescein, uranine, erythrosine B, rose bengal, phloxine B, 4,5-dibromofluorescein, rhodamine B, riboflavin, flavin mononucleotide, acriflavin, curcumin, resazurin, safranin-O, phenosafranin, neutral red, acridine orange, acid blue 43, 1,4-diamino-anthraquinone, 1,4-dihydroxy-anthraquinone, bromaminic acid sodium salt, carminic acid, ethyl violet, patent blue V, methyl orange, naphtol yellow S, methylene blue, indigo carmine, (4-dimethylaminostyryl)methylpyridinium iodide, quinoline yellow, quinoline yellow WS, thionine acetate, beta-carotene, coumarin 6, coumarin 343, coumarin 153, zinc-protoporphyrin IX, zinc-tetraphenylporphyrin tetrasulfonic acid, zinc-phtalocyanine, cyanidin chloride, indomonocarbocyanine sodium, resorufin, nile red, pyronin Y, 9-fluorenone carboxylic acid, 3-butoxy-5,7-diiodo-6-fluorone, 3-hydroxy-2,4,5,7-tetraiodo-6-fluorone, 2-chlorothioxanthone and quercetin. Preferred dyes include safranin-O, acridine orange, bromaminic acid sodium salt, ethyl violet, methyl orange, curcumin, riboflavin, flavin mononucleotide, methylene blue, zinc phthalocyanine, tetraphenylsulfonate porphyrin, quinolone yellow WS, quinaldine red, eosin Y, eosin Y disodium salt, erythrosin B, rose bengal, rhodamine B, phloxine B and dibromofluorescein.

The dye preferably comprises a conjugated system having at least 10 (more preferably at least 12) delocalized (π) electrons. A conjugated system is a system of connected p-orbitals with delocalized electrons in molecules, generally having alternating single and multiple bonds.

For BPMs intended for use in food or pharmaceutical applications the dye(s) is or are preferably known to be harmless and/or are approved for food and/or pharmaceutical use (e.g. by the U.S. Food and Drug Administration (FDA)), e.g. erythrosin B, flavin mononucleotide, curcumin, riboflavin, tartrazine, quinolone yellow, azorubine, amaranth, ponceau 4R, allura red AC, patent blue V, indigo carmine, brilliant blue FCF, chlorophyll derivatives, copper complexes of chlorophyll or chlorophyllin derivatives, carotenoids, sunset yellow FCF, carminic acid, green S, xantophyll derivatives, brilliant black BN, or one or more thereof.

The dye typically absorbs light at a wavelength longer than 400 nm to generate an excited photoinitiator molecule which abstracts an electron, a proton or both from a co-initiator to generate a free radical. Thus the curable composition preferably comprises a co-initiator. The free radical then causes curable monomers to cure. The co-initiator may be any chemical which can generate a free radical in reaction with the dye when the latter is in an electronic excited state, e.g. when the curable composition is irradiated with light matching with the absorption spectrum of the dye.

Preferably the co-initiator (i.e. component (c)) comprises a tertiary amine, an acrylated amine, an onium salt (e.g. a salt of a iodonium, sulfonium, phosphonium or diazonium ion), a triazine derivative, an organohalogen compound, an ether group, a ketone, a thiol, a borate salt, a sulfide (e.g. thioether), a pyridinium salt, a ferrocenium salt, or two or more thereof.

Preferred co-initiators include triethylamine, triethanolamine, methyl diethanol amine, dimethylethanolamine, ethylenediamine-tetra(2-propanol), 1,4-dimethyl piperazine, n-phenyldiethanolamine, 4-(dimethylamino)benzaldehyde, 7-diethylamino-4-methylcoumarin, 2-(diethylamino)ethyl methacrylate, carbon tetrabromide, diphenyliodonium chloride, 2-ethylhexyl-4-dimethylaminobenzoate, 4-(dimethylamino)benzonitrile, ethyl-4-dimethylaminobenzoate, dimethylaminopropylacrylamide, dimethylaminoethyl methacrylate, diphenyliodonium nitrate, N-phenylglycine, 2,4,6-tris(trichloromethyl)-1,3,5-triazine, 2-(4-methoxyphenyl)-4,6-bis(trichloromethyl)-1,3,5-triazine, hexaethylmelamine, hexamethylenetetramine, piperonyl alcohol, N,N-dimethyl-p-toluidine, L-arginine, and mixtures comprising two or more thereof.

Preferably the curable composition comprises 0.002 to 4 wt %, more preferably 0.005 to 2 wt %, especially 0.005 to 0.9 wt % of dye (component (b)).

Preferably the curable composition comprises 0.01 to 40 wt %, more preferably 0.05 to 20 wt %, even more preferably 0.1 to 5 wt %, of co-initiator (component (c)).

Preferably the molar ratio of the dye and the co-initiator present in the curable composition is larger than 1:1, more preferably larger than 1:2, especially larger than 1:5, more especially larger than 1:10.

The curable composition preferably comprises a curable monomer comprising at least one anionic or cationic group (component (a)), i.e. a cationic group for the AEL and an anionic group for the CEL. The preferred anionic group(s) which may be present in the curable monomer include acidic groups, for example a sulpho, carboxy and/or phosphato groups, especially sulpho groups. Preferred cationic group(s) which may be present in the curable monomer include quaternary ammonium and phosphonium groups, especially quaternary ammonium groups.

Preferably the curable monomer is not polymeric, but monomeric or oligomeric, i.e. the curable monomer preferably has a molecular weight (MW) which satisfies the equation:

$$MW < (3000 + 300n)$$

wherein:
MW is the molecular weight of the curable monomer; and
n has a value of 1 to 6 and is the number of ionic groups present in the curable monomer.

The curable monomer preferably comprises an anionic group or a cationic group and one or more ethylenically unsaturated groups, e.g. polymerizable ethylenically unsaturated groups.

Depending on the pH of the curable composition, the anionic or cationic groups present in the curable monomer may partially or wholly form a salt with a counter-ion, e.g. sodium, lithium, ammonium, potassium and/or pyridinium for anionic groups and chloride and/or bromide for cationic groups.

The preferred ethylenically unsaturated groups which may be present in the curable monomer are vinyl groups, e.g. in the form of (meth)acrylic, allylic or styrenic groups. The (meth)acrylic groups are preferably (meth)acrylate or (meth)acrylamide groups, more preferably (meth)acrylamide groups, e.g. acrylamide or methacrylamide groups.

Due to environmental and health considerations, the use of a perfluorinated polymer backbone, such as poly(tetrafluoroethylene), is not preferred. Generally non-perfluorinated monomers are lower in cost. Therefore perfluorinated monomers are not preferred and hence the BPM is preferably free from perfluorinated polymers.

Examples of preferred curable monomers include the following compounds of Formula (A), (B), (CL), (SM), (MA), (MB-α), (C), (ACL-A), (ACL-B), (ACL-C), and/or (AM-B):

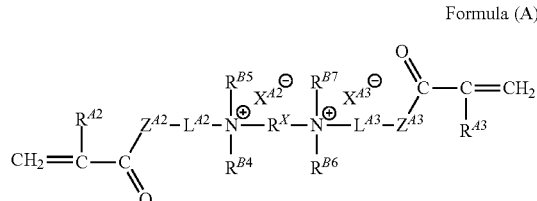

Formula (A)

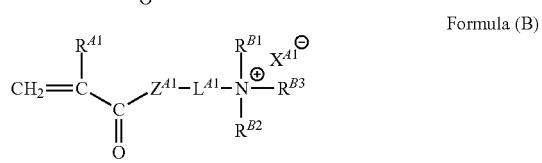

Formula (B)

wherein in Formulas (A) and (B),
$R^{A1}$ to $R^{A3}$ each independently represent a hydrogen atom or an alkyl group;
$R^{B1}$ to $R^{B7}$ each independently represent an alkyl group or an aryl group;
$Z^{A1}$ to $Z^{A3}$ each independently represent —O— or —NRa—, wherein Ra represents a hydrogen atom or an alkyl group;
$L^{A1}$ to $L^{A3}$ each independently represent an alkylene group, an arylene group or a divalent linking group of a combination thereof;
$R^X$ represents an alkylene group, an alkenylene group, an alkynylene group, an arylene group, or a divalent linking group of a combination thereof; and
$X^{A1}$ to $X^{A3}$ each independently represent an organic or inorganic anion, preferably a halogen ion or an aliphatic or aromatic carboxylic acid ion.

Examples of compounds of Formula (A) or (B) include:

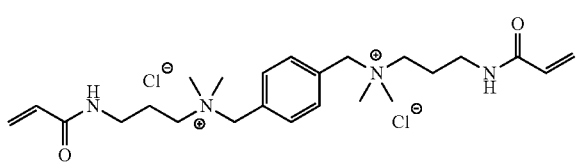

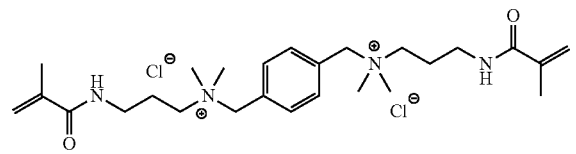

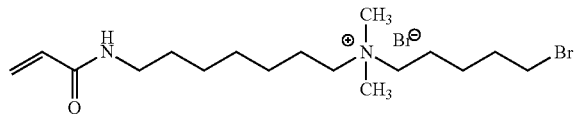

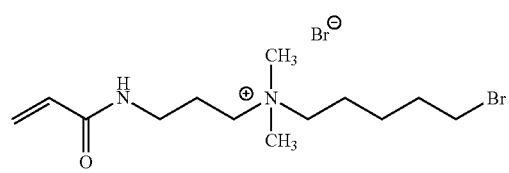

-continued
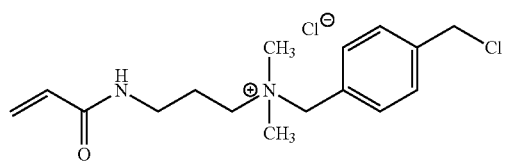
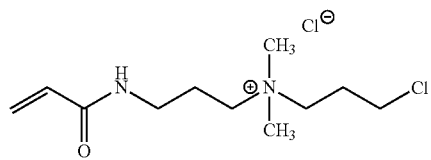
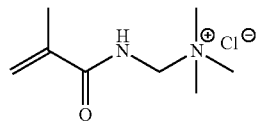
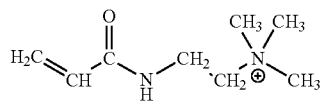
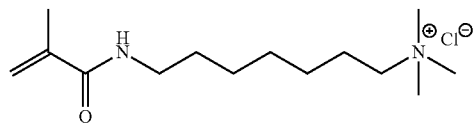
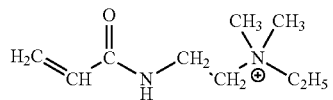
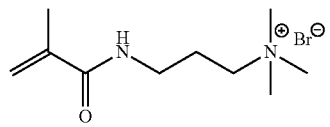
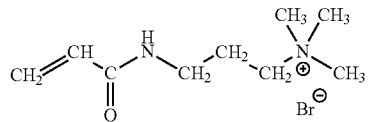
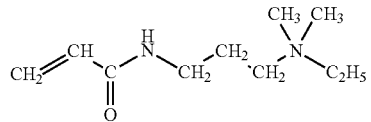
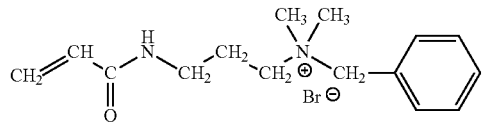
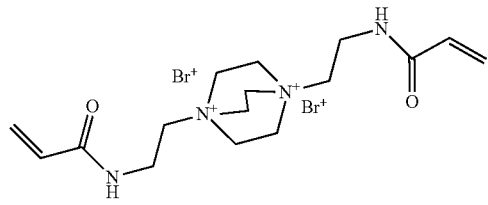
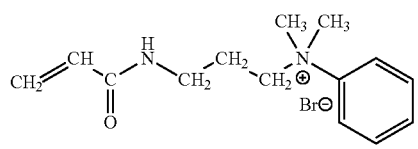

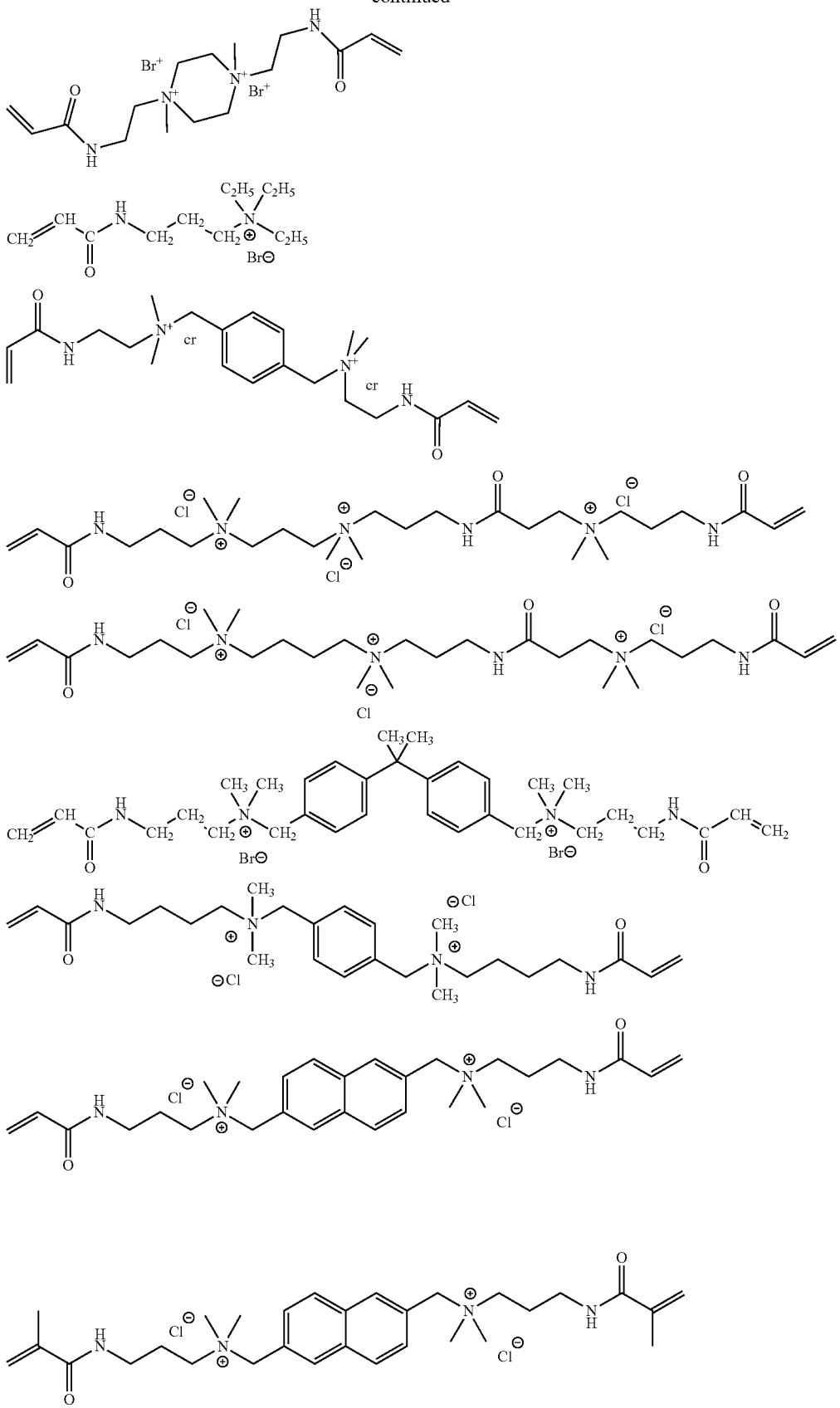

Synthesis methods can be found in e.g. US2015/0353721, US2016/0367980 and US2014/0378561.

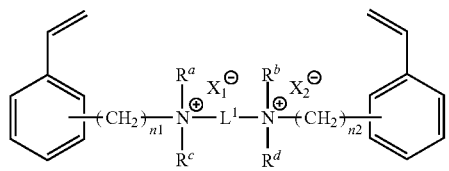

(CL)

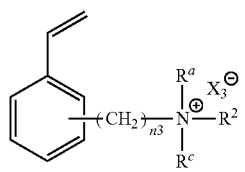

(SM)

wherein in Formulas (CL) and (SM),
$L^1$ represents an alkylene group or an alkenylene group;
$R^a$, $R^b$, $R^c$, and $R^d$ each independently represent a linear or branched alkyl group or an aryl group,
$R^a$ and $R^b$, and/or $R^c$ and $R^d$ may form a ring by being bonded to each other;
$R^1$, $R^2$, and $R^3$ each independently represent a linear or branched alkyl group or an aryl group,
$R^1$ and $R^2$, or $R^1$, $R^2$ and $R^3$ may form an aliphatic heterocycle by being bonded to each other;
n1, n2 and n3 each independently represent an integer of 1 to 10; and
$X_1^-$, $X_2^-$ and $X_3^-$ each independently represent an organic or inorganic anion.
Examples of formula (CL) and (SM) include:

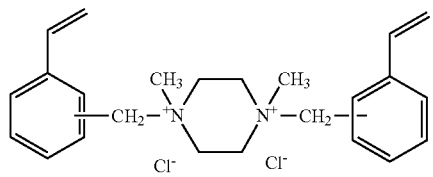

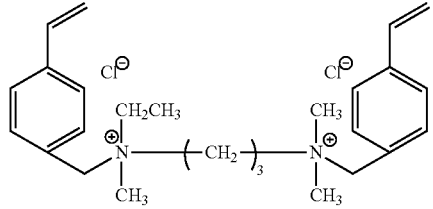

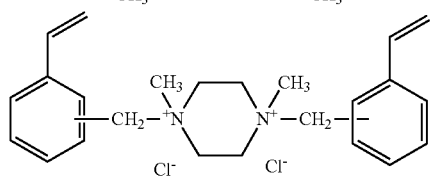

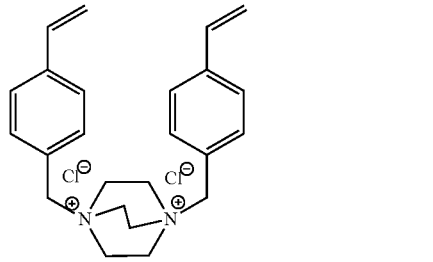

-continued

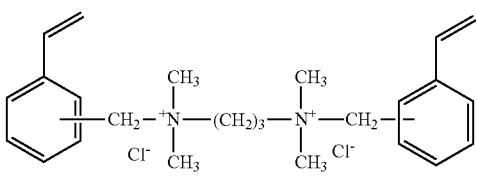

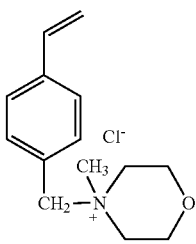

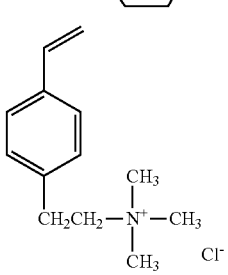

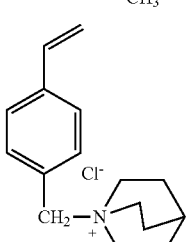

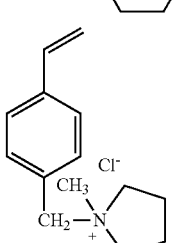

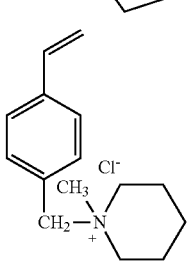

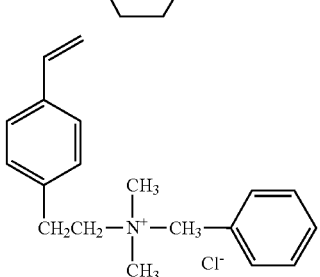

Synthesis methods can be found in EP3184558 and US2016/0001238.

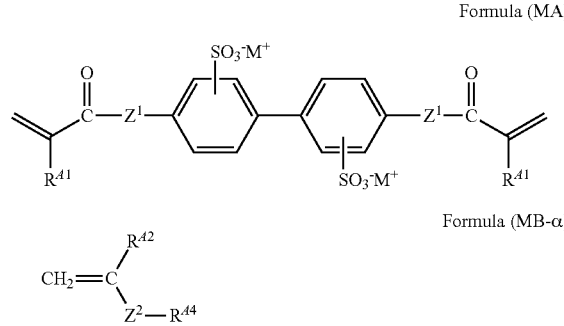

Formula (MA)

Formula (MB-α)

wherein in formula (MA) and (MB-α), $R^{A1}$ represents a hydrogen atom or an alkyl group;

$Z^1$ represents —O— or —NRa—, wherein Ra represents a hydrogen atom or an alkyl group;

$M^+$ represents an organic or inorganic cation, preferably a hydrogen ion or an alkali metal ion;

$R^{A2}$ represents a hydrogen atom or an alkyl group, $R^{A4}$ represents an organic group comprising a sulphonic acid group and having no ethylenically unsaturated group; and $Z^2$ represents —NRa—, wherein Ra represents a hydrogen atom or an alkyl group preferably a hydrogen atom.

Examples of formula (MA) and (MB-α) include:

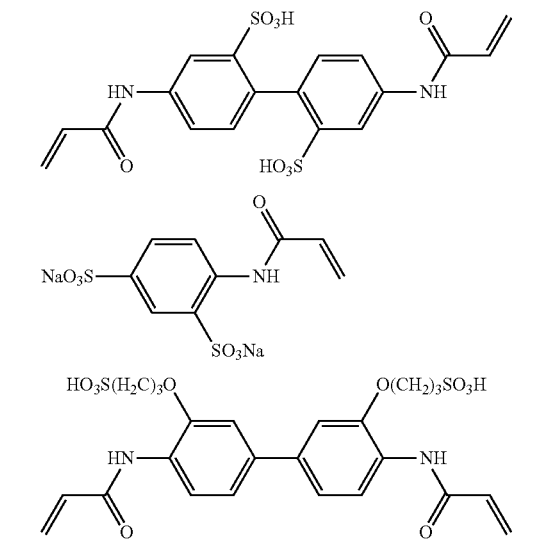

Synthesis methods can be found in e.g. US2015/0353696.

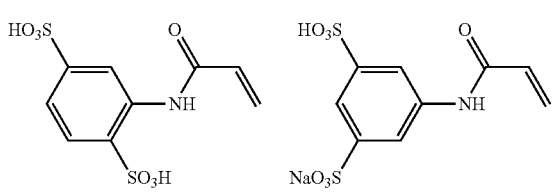

Synthesis methods can be found in e.g. US2016/0369017.

Synthesis methods can be found in EP3187516.

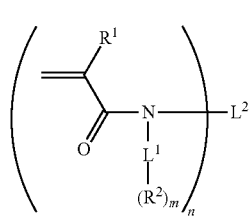

Formula (C)

wherein in Formula (C),
- $L^1$ represents an alkylene group;
- n represents an integer of 1 to 3, preferably 1 or 2;
- m represents an integer of 1 or 2;
- $L^2$ represents an n-valent linking group;
- $R^1$ represents a hydrogen atom or an alkyl group;
- $R^2$ represents $-SO_3^-M^+$ or $-SO_3R^3$; in case of plural $R^2$'s, each $R^2$ independently represents $-SO_3^-M^+$ or $-SO_3R^3$;
- $M^+$ represents a hydrogen ion, an inorganic ion, or an organic ion; and
- $R^3$ represents an alkyl group or an aryl group.

Examples of formula (C) include:

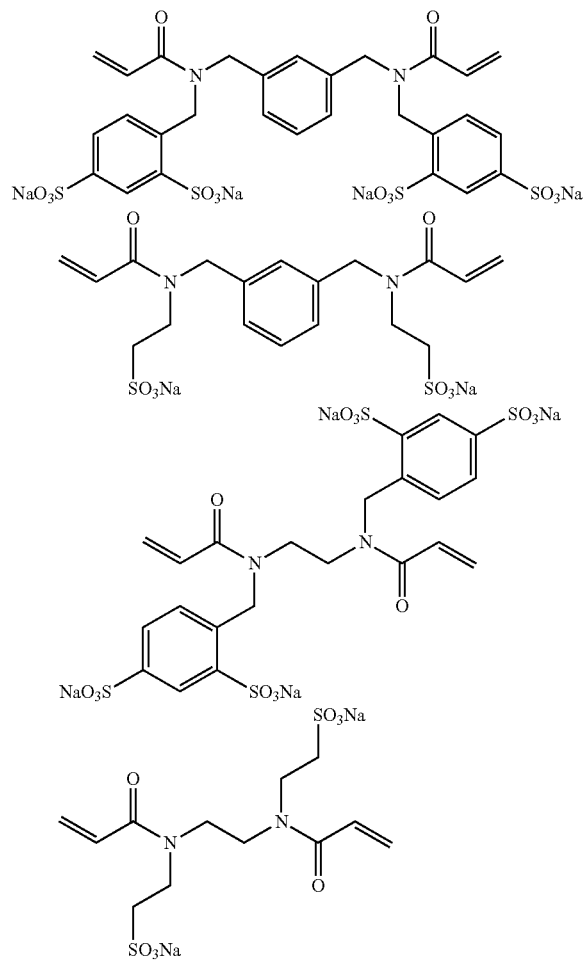

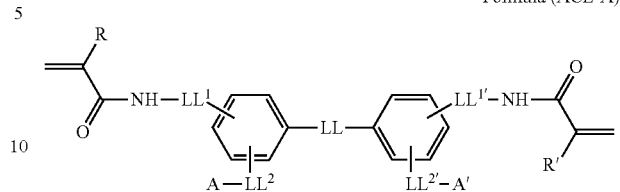

Formula (ACL-A)

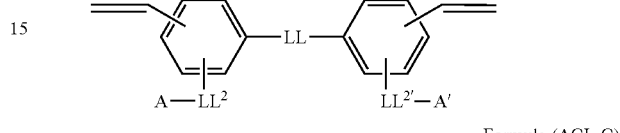

Formula (ACL-B)

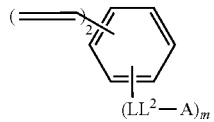

Formula (ACL-C)

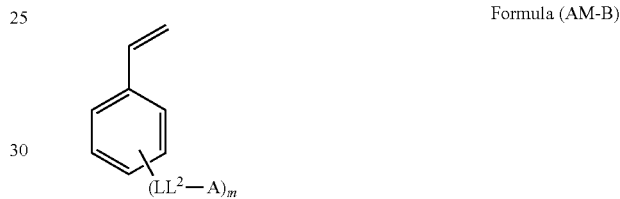

Formula (AM-B)

wherein in Formulas (ACL-A), (ACL-B), (ACL-C) and (AM-B),
- each of R and R' independently represents a hydrogen atom or an alkyl group;
- LL represents a single bond or a bivalent linking group;
- each of $LL^1$, $LL^{1\prime}$, $LL^2$, and $LL^{2\prime}$ independently represents a single bond or a bivalent linking group; and each of A and A' independently represents a sulfo group in free acid or salt form; and
- m represents 1 or 2.

Examples of formula (ACL-A), (ACL-B), (ACL-C) and (AM-B) include:

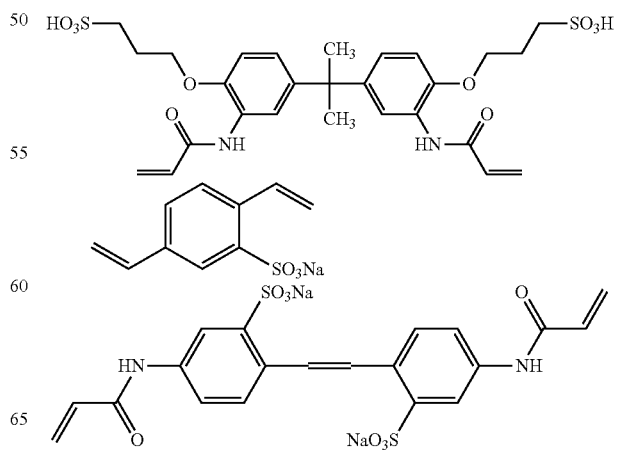

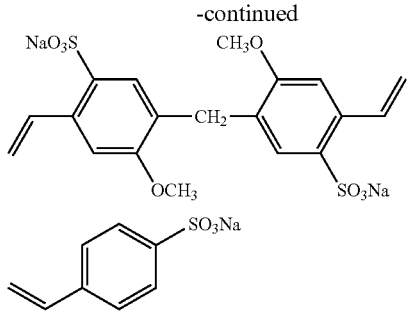

Synthesis methods can be found in US2016/0362526.
Other examples include:

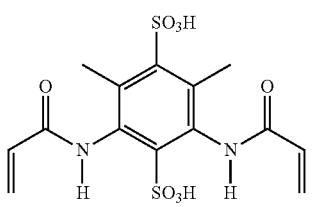
M-23

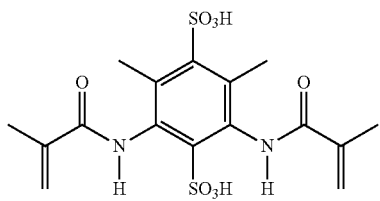
M-24

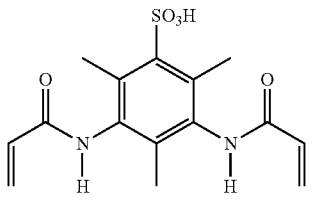
M-25

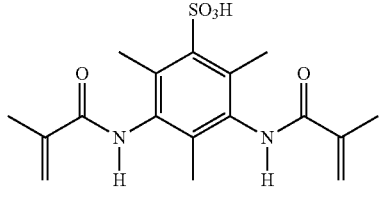
M-26

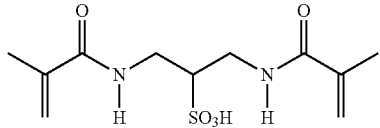
M-27

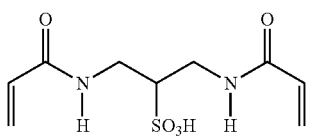
M-28

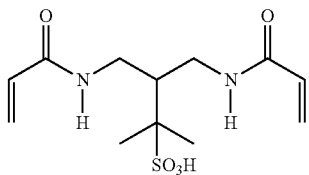
M-29

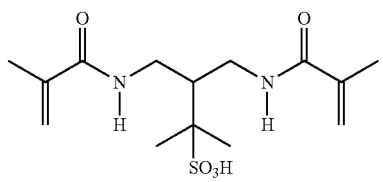
M-30

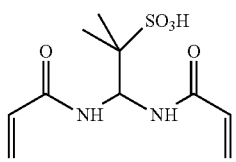
M-31

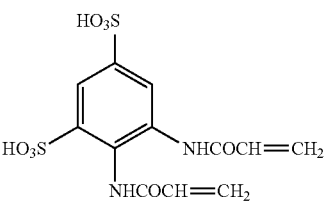
M-32

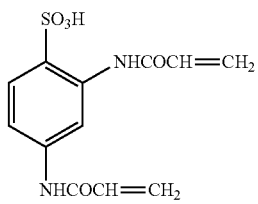
M-33

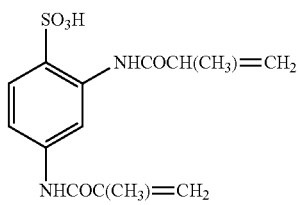
M-34

Optionally the curable composition further comprises, e.g. as component (e), one or more solvents. The solvent may be any solvent which does not copolymerize with the other components or act as a co-initiator. In an embodiment the solvent preferably comprises water and optionally an organic solvent, especially where some or all of the organic solvent is water-miscible. The water is useful for dissolving the curable monomer and the organic solvent is useful for dissolving other organic components of the curable composition. The solvent is useful for reducing the viscosity and/or surface tension of the curable composition.

Preferably, in some embodiments, the curable composition comprises 0 to 60 wt %, more preferably 4 to 50 wt %, most preferably 10 to 45 wt % of solvent (e.g. as component (e)). In other embodiments the curable composition comprises 35 to 95 wt %, preferably 60 to 90 wt % of solvent (e.g. as component (e)).

Preferably the BPM comprises a porous support. A porous support may strengthen the BPM. The pores of the porous support may be filled with a first curable composition(s) and then cured before applying a second curable composition (comprising curable monomers comprising at least one ionic group of opposite charged to the curable monomer(s) of the first curable composition) and then curing the second curable composition.

As examples of porous supports there may be mentioned woven and non-woven synthetic fabrics and extruded films. Examples include wetlaid and drylaid non-woven material, spunbond and meltblown fabrics and nanofiber webs made from, e.g. polyethylene, polypropylene, polyacrylonitrile, polyvinyl chloride, polyphenylenesulfide, polyester, polyamide, polyaryletherketones such as polyether ether ketone and copolymers thereof. Porous supports may also be porous membranes, e.g. polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene and polychlorotrifluoroethylene membranes and derivatives thereof.

The porous support preferably has an average thickness of between 10 and 700 μm, more preferably between 20 and 500 μm.

Preferably the porous support has a porosity of 30 and 95%. The porosity of the support may be determined by a porometer, e.g. a Porolux™ 1000 from IB-FT GmbH, Germany.

The porous support, when present, is optionally a porous support which has been treated to modify its surface energy, e.g. to values above 45 mN/m, preferably above 55 mN/m. Suitable treatments include corona discharge treatment, plasma glow discharge treatment, flame treatment, ultraviolet light irradiation treatment, chemical treatment or the like, e.g. for the purpose of improving the wettability of and the adhesiveness of the polymer to the porous support.

Commercially available porous supports are available from a number of sources, e.g. from Freudenberg Filtration Technologies (Novatexx materials), Lydall Performance Materials, Celgard LLC, APorous Inc., SWM (Conwed Plastics, DelStar Technologies), Teijin, Hirose, Mitsubishi Paper Mills Ltd and Sefar AG.

Preferably the support is a polymeric support.

Aromatic porous supports include porous supports derived from one or more aromatic monomers, for example aromatic polyamide (aramid), (sulfonated) polyphenylenesulfone, poly(phenylene sulfide sulfone), aromatic polyesters (e.g. polyethyleneterephthalate (PET) or polybutyleneterephthalate (PBT)), aromatic polyether ether ketone, polyphenylenesulfide or a combination of two or more of the foregoing. In one embodiment the support strongly absorbs UV light (up to 380 nm). Absorption is regarded as strong as the support has less than 90% transmittance at a wavelength longer than 340 nm as measured in a UV spectrophotometer.

Examples of commercially available aromatic porous supports include Teijin, Hirose, Mitsubishi Paper Mills Ltd and Sefar AG.

According to a second aspect of the present invention there is provided a stack of membranes comprising the BPM according to the first aspect of the present invention.

According to a third aspect of the present invention there is provided an electrochemical device comprising the BPM according to the first aspect of the present invention or the stack of membranes according to the second aspect of the present invention.

According to a fourth aspect of the present invention there is provided a process for manufacturing a bipolar membrane comprising a cation exchange layer (CEL) and an anion exchange layer (AEL) wherein the colour properties of the CEL are visibly different to the colour properties of the AEL, the process comprising curing, in either order or simultaneously, a first curable composition to form the AEL and curing a second curable composition to form the CEL.

Preferably one or both of the first curable composition and the second curable composition comprises a dye, preferably a dye which is a coloured photoinitiator. Preferences for the dye and for the curable compositions are as described above in relation to the first aspect of the present invention. Thus, for example, the dye preferably does not form ions when irradiated with light.

In a preferred embodiment both the first curable composition and the second curable composition comprise a dye which is a coloured photoinitiator, especially a photoinitiator which forms radicals when irradiated with light. Preferably the dye present in the first curable composition has a different chemical formula to the dye present in the second curable composition, although this is not always necessary.

The process according to the fourth aspect of the present invention preferably further comprises adhering the CEL and AEL together, e.g. by pressing the CEL and AEL together, optionally with heating.

The AEL and the CEL may be made independently and subsequently adhered together, e.g. by a lamination process comprising applying compression force and/or heat to the AEL and CEL in order to bond them together and thereby form the BPM. Alternatively the BPM may be prepared by a process comprising curing a first curable composition to form the AEL or CEL, followed by applying a second curable composition to the formed AEL or CEL and curing that second curable composition to form the other of the AEL and CEL thereon. Optionally one or both of the AEL and the CEL comprises a porous support.

In a preferred embodiment, the process for manufacturing a bipolar membrane comprises applying a curable composition (preferably containing a dye) continuously to a moving (porous) support, preferably by means of a manufacturing unit comprising curable composition application stations (e.g. one for the CEL and another for the AEL), one or more irradiation source(s) for curing the curable compositions, a membrane collecting station and a means for moving the support from the curable composition application stations to the irradiation source(s) and to the membrane collecting station.

The curable composition application stations may be located at an upstream position relative to the irradiation source(s) and the irradiation source(s) is/are located at an upstream position relative to the membrane collecting station.

Examples of suitable coating techniques for applying the curable compositions include slot die coating, slide coating, air knife coating, roller coating, screen printing, and dipping. Depending on the used technique and the desired end specifications, it might be necessary to remove excess coating from the substrate by, for example, roll-to-roll squeeze, roll-to-blade or blade-to-roll squeeze, blade-to-blade squeeze or removal using coating bars. Curing by light is preferably done at wavelengths between 400 nm and 800 nm using doses between 40 and 1500 mJ/cm$^{-2}$. In some cases additional drying might be needed for which temperatures between 40° C. and 200° C. could be employed.

The invention will now be illustrated with non-limiting Examples where all parts and percentages are by weight unless specified otherwise.

In the Examples the following properties were measured by the methods described below.

TABLE 1

Materials

| Component | Component type | Abbreviation |
|---|---|---|
| Sodium salt of 2-acryloylamido-2-methylpropanesulfonic acid from Sigma-Aldrich. | (a) | Na-AMPS |
| 3-Acrylamidopropyl-trimethylammonium chloride from Kohjin. | (a) | DMAPAA-Q |
| N,N-(1,4-phenylenebis(methylene))bis(3-acrylamido N,N-dimethylpropan-1-aminium) bromide, a positively charged cross-linking agent synthesized as described in WO2013011273, page 25, lines 15-21. | (a) | CL-3 |
| Sodium salt of divinylbenzene sulfonate from TOSOH. | (a) | Na-DVBS |
| Triethanolamine (a co-initiator from Sigma-Aldrich). | (c) | TEOA |
| Diphenyliodonium chloride (a co-initiator from TCI Co.). | (c) | IO |
| Darocur™ 1173 (a Type I photoinitiator from BASF (this is not a coloured photoinitiator). | NA (a photoinitiator which is not a dye) | 1173 |
| Fluorescein disodium salt (from Sigma-Aldrich) | (b) | FL |
| Erythrosin B (from Sigma-Aldrich) | (b) | EB |
| Methylene blue (from Sigma-Aldrich) | (b) | MB |
| Resazurin sodium salt (from Sigma-Aldrich) | (b) | RZ |
| Quinaldine red (from Sigma-Aldrich) | (b) | QR |
| Viledon® Novatexx 2223-10 (a nonwoven, polypropylene/polyethylene porous support from Freudenberg Filtration Technologies) | Porous support | 2223-10 |

TABLE 2

Properties of several coloured photoinitiators in the stated solvents

| Coloured Photoinitiator | Abs. max (nm) | Solvent | Molar attenuation coefficient ($M^{-1}cm^{-1}$) | Number of conjugated π electrons |
|---|---|---|---|---|
| 1173 | 243 | ethanol | | 6 |
| FL | 480 | water | 92300 | 20 |
| EB | 530 | ethanol | 84500 | 20 |
| MB | 654 | ethanol | 40700 | 14 |
| RZ | 600 | water | 20600 | 14 |
| QR | 528 | Water | 108000 | 18 |

Step (a) Preparation of Compositions for Making the BPMs

The compositions used to make the BPM AELs contained the ingredients indicated in Table 3 below wherein the photoinitiator is 1173, EL, EB, MB, RZ or QR:

TABLE 3

AEL Compositions used to make the BPM's

| Component type | Component Name (wt %) |
|---|---|
| (a) | DMAPAA-Q (15 wt %) |
| (a) | CL-3 (45 wt %) |
| Photoinitiator | (0.5 wt %) |
| (c) | TEOA (1 wt %) |
| (c) | IO (0.25 wt %) |
| (e) | Water (38.25 wt %) |

The compositions used to make the BPM CELs contained the ingredients indicated in Table 4 below wherein the photoinitiator is 1173, EL, EB, MB, RZ or QR:

TABLE 4

CEL Compositions used to make the BPM's

| Component type | Component Name (wt %) |
|---|---|
| (a) | Na-AMPS (35 wt %) |
| (a) | Na-DVBS (20 wt %) |
| Photoinitiator | Photoinitiator (0.5 wt %) |
| (c) | TEOA (1 wt %) |
| (c) | IO (0.25 wt %) |
| (e) | Water (43.25 wt %) |

Step (b)—Preparation of the BPMs

The General method for preparing six BPMs (BPM1 to BPM6 as shown in Table 5 below) from the compositions outlined in Table 4 (for the CEL) and Table 3 (for the AEL) was as follows:

A composition outlined in Table 4 (CEL compositions) above was coated as a 100 μm layer onto a PET sheet using a 100 μm Meyer bar. A porous support (2223-10) was placed in the layer of the composition and any excess CEL composition was scraped-off. The composition present in the porous support was then cured by placing it on a conveyer belt set at 5 m/min, equipped with a Heraeus F450 microwave-powered UV-curing system with a medium-pressure mercury bulb (240 W/cm, 50%) to give what will become the CEL of the BPM. Next a composition outlined in Table 3 (AEL compositions) above was coated as a 100 μm layer onto the previously formed CEL. A porous support (2223-10) was placed in the layer of composition (i.e. of AEL compositions) and any excess AEL composition was scraped-off. The AEL composition present in the porous support was then cured by placing it on a conveyer belt set at 5 m/min, equipped with a Heraeus F450 microwave-powered UV-curing system with a medium-pressure mercury bulb (240 W/cm, 100%) to give a BPM comprising an AEL and a CEL, each of which comprised a porous support.

Colour Properties of the BPMs

The colour properties of the BPM's AELs and CELs arising from step (b) were measured according to CIEDE2000 using a Konica Minolta CM-3600a spectrophotometer, using an 8 mm MAV measurement area and a white calibration plate (Minolta CM-A139) of the Optical Tool sample holder. The colour data of the AELs and CELs are shown below in Table 5:

TABLE 5

Colour data of BPM1 to BPM6 (EL, EB, MB, RZ or QR identify the coloured photoinitiator used and 1173 is not a coloured photoinitiator)

|  | Component | BPM1 | BPM2 | BPM3 | BPM4 | BPM5 | BPM6 |
|---|---|---|---|---|---|---|---|
| AEL | Photoinitiator | 1173 | FL | EB | MB | RZ | QR |
|  | L' | 86 | 86 | 60 | 74 | 38 | 35 |
|  | C' | 3 | 97 | 70 | 11 | 15 | 46 |
|  | h' (°) | 110 | 66 | 6 | 234 | 335 | 355 |
| CEL | Photoinitiator | 1173 | FL | MB | EB | QR | RZ |
|  | L' | 82 | 72 | 35 | 30 | 38 | 68 |
|  | C' | 2 | 62 | 16 | 42 | 18 | 21 |
|  | h' (°) | 138 | 78 | 255 | 8 | 358 | 332 |
| Colour difference | $\Delta E_{00}$ (AEL vs. CEL) | 3.4 | 21.1 | 81.1 | 66.8 | 7.2 | 43.2 |

In Table 5 the following abbreviations are used: Photoinitiator means the photoinitiator used to make the AEL (from the composition described in Table 3 above) or the CEL (from the composition described in Table 4 above).

L' means lightness according to CIEDE2000
C' means chroma according to CIEDE2000
h' means hue angle according to CIEDE2000.
AEL means anion exchange layer.
CEL means cation exchange layer.
$\Delta E_{00}$ means the color difference between the AEL and the CEL according to CIEDE2000

The invention claimed is:

1. A bipolar membrane (BPM) comprising a cation exchange layer (CEL) and an anion exchange layer (AEL) wherein at least one of the CEL and AEL contains a dye which is a photoinitiator and the colour properties of the CEL are visibly different to the colour properties of the AEL, wherein the dye is free from transition metal ions.

2. The BPM according to claim 1 wherein the dye which is a photoinitiator is a Norrish Type II photoinitiator having an absorption maximum at a wavelength longer than 400 nm, when measured at a temperature of 23° C. in one or more of the following solvents: water, ethanol and toluene.

3. The BPM according to claim 1 wherein the AEL and CEL are free from dyes which form ions when irradiated with light.

4. The BPM according to claim 1 wherein the AEL and CEL each contain a dye and the dye present in the AEL is different to or is the same as the dye present in the CEL.

5. The BPM according to claim 1 wherein the visible difference in colour properties comprises a difference in $\Delta E_{00}$, as expressed according to CIEDE2000, of at least 4.

6. The BPM according to claim 1 wherein at least one of the AEL and CEL has a lightness, as expressed by L' according to CIEDE2000, of less than 90 and at least 10.

7. The BPM according to claim 1 wherein at least one of the AEL and CEL has a saturation, as expressed by chroma C' according to CIEDE2000, of at least 5.

8. The BPM according to claim 1 wherein the colour properties of the AEL and/or the CEL are substantially homogeneous.

9. The BPM according to claim 1 which is free from perfluorinated polymers.

10. The BPM according to claim 1 wherein the CEL and/or the AEL is obtained by curing a curable composition comprising a dye which functions as a photoinitiator, and a co-initiator which can generate a free radical in reaction with the dye when the dye is in an electronic excited state.

11. The BPM according to claim 1 wherein said dye is not covalently bound to the AEL or CEL.

12. The BPM according to claim 1 wherein:
the visible difference in color properties between the AEL and CEL make the layers distinguishable by human eye and by automatic sensors;
the dye has a molar attenuation coefficient at the absorption maximum of at least 7,500 $M^{-1}$ $cm^{-1}$; and
the dye comprises a conjugated system having at least 10 delocalized electrons.

13. The BPM according to claim 1 wherein the visible difference in color properties between the AEL and CEL make the layers distinguishable by human eye and by automatic sensors.

14. The BPM according to claim 1 wherein the dye has a molar attenuation coefficient at the absorption maximum of at least 7,500 $M^{-1}$ $cm^{-1}$.

15. The BPM according to claim 1 wherein the dye comprises a conjugated system having at least 10 delocalized electrons.

16. An electrochemical device comprising the BPM according to claim 1.

17. A process for manufacturing a bipolar membrane comprising a cation exchange layer (CEL) and an anion exchange layer (AEL) wherein the colour properties of the CEL are visibly different to the colour properties of the AEL, the process comprising curing, in either order or simultaneously, a first curable composition to form the AEL and curing a second curable composition to form the CEL, wherein at least one of the first curable composition and the second curable composition contains a dye which is a photoinitiator.

18. The process according to claim 17 wherein the dye has an absorption maximum at a wavelength longer than 400 nm, when measured at a temperature of 23° C. in one or more of the following solvents: water, ethanol and toluene.

19. The process according to claim 17 wherein one or both of the first curable composition and the second curable composition comprises:
a. one or more curable monomers comprising at least one anionic or cationic group;
b. a dye which is a photoinitiator;
c. optionally a co-initiator;
d. optionally a curable monomer which is free from anionic and cationic groups; and
e. optionally a solvent.

20. The process according to claim 17 wherein both the first curable composition and the second curable composition comprise a dye which is a photoinitiator and the dye present in the first curable composition has a different chemical formula to the dye present in the second curable composition.

* * * * *